United States Patent Office 3,411,477
Patented Nov. 19, 1968

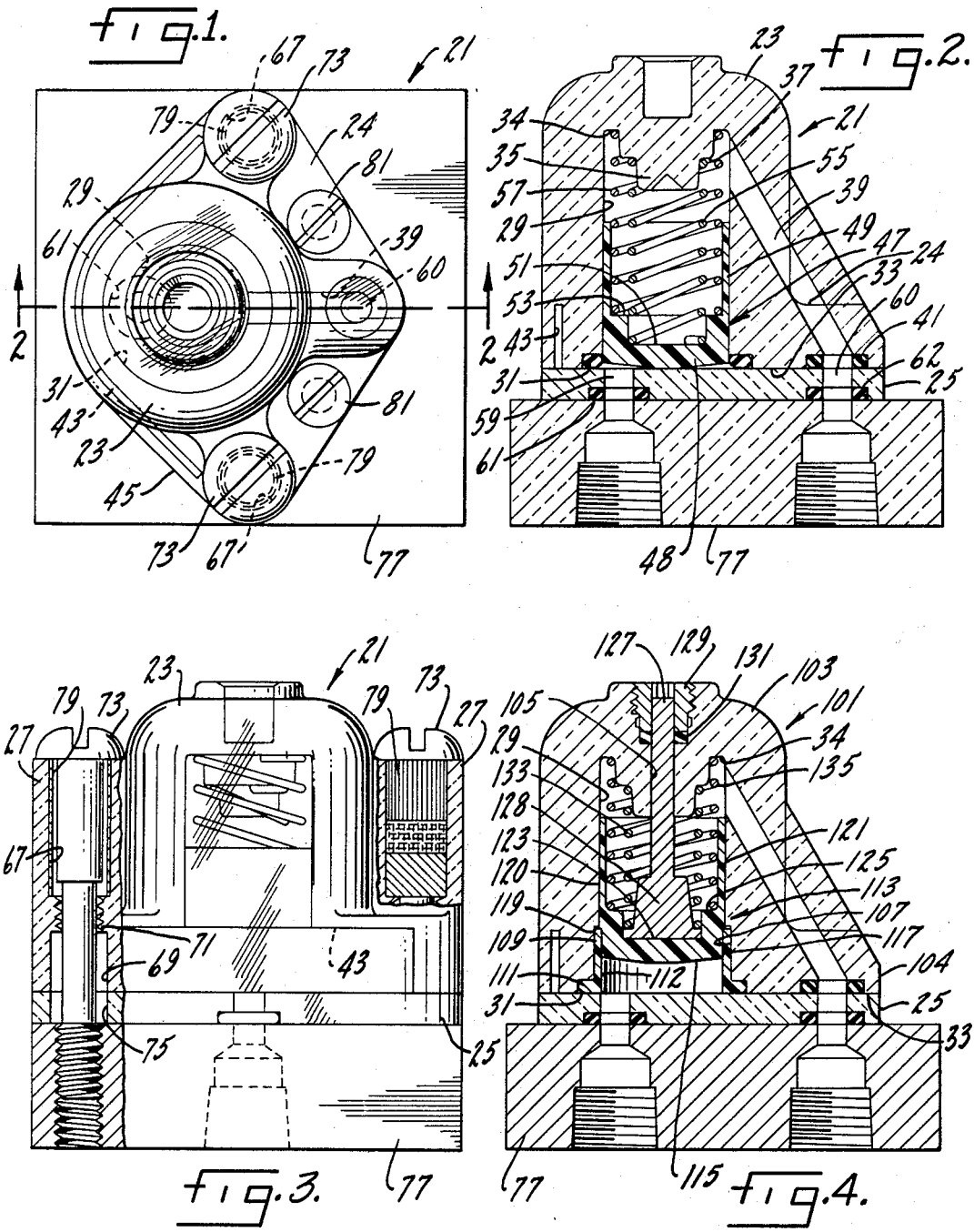

3,411,477
PRESSURE DIFFERENTIAL INDICATOR
Walter J. Kudlaty, Elmhurst, Ill., assignor to Marvel Engineering Company, Chicago, Ill., a corporation of Delaware
Filed Aug. 3, 1967, Ser. No. 658,201
8 Claims. (Cl. 116—70)

ABSTRACT OF THE DISCLOSURE

A fluid pressure differential indicator including a dome-shaped body of transparent material having a floating piston located in a cavity therein with said piston adapted to move between first and second positions in said cavity upon the creation of a fluid pressure differential between opposite sides of the piston and a reference index located exteriorly of said domed body and in alignment with said cavity.

Summary of the invention

This invention relates to a visual indicator for fluid pressure differentials and more particularly to such an indicator which utilizes a free floating piston and a remotely located movement reference for said piston.

An object is a pressure differential indicating mechanism which may be formed from a transparent plastic material.

Another object is a fluid pressure differential indicating means which can be easily read from almost any position around the device.

Another object is a fluid pressure differential indicator which may be easily mounted on a filter element.

Another object is a fluid pressure differential indicator in which the indicator references may be easily changed.

Another object is a pressure differential indicator in which the indicating scale is free from contact with the hydraulic fluid.

Another object is a visual indicator having a replaceable name plate which can be easily inserted and removed.

Another object is a visual indicator in which a paper name plate may be utilized.

Another object is a visual indicator for fluid pressure differential in which the indicator has a snap action.

Other objects may be found in the following specification, claims and drawings.

Brief description of the drawings

The invention is illustrated more or less diagrammatically in the following drawings wherein:

FIGURE 1 is a top plan view of a fluid pressure differential indicator of this invention;

FIGURE 2 is a cross-sectional view taken along line 2—2 of FIGURE 1;

FIGURE 3 is an elevational view of the apparatus of FIGURE 1 with some parts broken away and others shown in cross-section; and FIGURE 4 is a cross-sectional view similar to that of FIGURE 2 of a modified form of the invention.

Description of the preferred embodiments

Referring to the drawings and particularly to FIGURES 1, 2 and 3, the numeral 21 generally designates an indicator assembly which includes a generally dome-shaped body 23 having an enlarged base portion 24 to which a base plate 25 is attached. Cylindrical bosses 27 are formed rising out of the base portion 24 on opposite sides of the dome-shaped body from each other. A generally cylindrical cavity 29 is formed in the dome-shaped body and extends from a circular opening 31 in the base surface 33 to a closed end 34. The closed end 34 has an inwardly projecting portion 35 of smaller diameter than the cavity and which is surrounded by a shoulder portion 37 also spaced from the closed end of the cavity. A passage 39 extends from the cavity adjacent the closed end thereof diagonally through the body to the base portion where it merges with a circular hole 41 formed in the base surface. A narrow elongated arcuate slot 43 is cut into the base surface 33 of the body and this slot extends generally parallel to the exterior wall 45 of the base portion 24 of the body.

A free floating cup-shaped piston 47 is positioned in the cylindrical cavity 29. This piston is formed with a base portion 48 and a skirt portion 49. An internal recess 51 is formed in the base portion and this is surrounded by an internal annular shoulder 53. A compression spring 55 fits in the recessed portion 51 and fits around the projecting portion 35 at the closed end of the cavity. A second compression spring 57 engages the annular shoulder portion 53 of the piston and fits around the base of the projecting portion 35 at the closed end of the cavity.

The base plate 25 is formed with an opening 59 extending therethrough which aligns with the opening 31 to the cavity 29 and an opening 60 which is aligned with the hole 41 in the base surface 33. These openings are enlarged at 61 and 62 respectively on the face of the plate 25 which is positioned oppositely to the base surface 33 of the body 23.

Cylindrical holes 67 extending from the dome side of the body are formed in the bosses 27 and cylindrical holes 69 extending from the base side are also formed in the bosses. These holes are connected in each boss by a threaded passage 71. Threaded bolts 73 extend through these holes and the threaded passages 71 and through openings 75 in the base plate 25 to permit the body 23 to be fastened to an object such as a filter housing or to the adapter plate 77 shown in the drawings. Also positioned in the holes 67 of the bosses 23 are tubes or sleeves 79 which may be formed of plastic and the outside of which may be marked with indicia indicating distance such as bands of different colors as shown in the drawings. These sleeves are generally aligned with the cavity 29 in the body 23 to provide reference guides for movement of the cup-shaped piston 47. The body 23 may be attached to the base plate 25 by means of threaded fasteners 81. O-type ring seals may be provided around the openings where the various members are connected to one another.

A modified indicator assembly 101 is shown in FIGURE 4 and includes a dome-shaped body 103 having an enlarged base portion 104 connected to a base plate 25. The body 103 is generally similar to the body 23 shown in FIGURES 1, 2 and 3, but differs primarily in that a passage 105 extends from the closed end 34 of the cavity 29 to the outside of the body. Additionally the cavity 29 is enlarged at 107 adjacent the opening 31 into the cavity at the base surface 33 of the body.

A sleeve-type seal 109 of plastic having a flange 111 at one end thereof is adapted to fit in the enlarged portion 107 of the cavity 29 with its flange being seated in the opening 31. The interior wall 112 of this sleeve extends inwardly of the wall of the main cavity 29. A cup-shaped piston 113 having a base 115 with a portion 117 thereof of reduced outside diameter is positioned to move in the cavity 29. A shoulder 119 is located between the outside wall 120 of the piston and the portion 117 of reduced diameter. The shoulder rests on the top of the sleeve-type seal 109 when the piston is located adjacent the open end 31 of the cavity. The cup-shaped piston includes a skirt portion 121, an internal recessed portion 123 in the base portion and a shoulder portion 125 between the recessed portion and the skirt. An indicator stem 127 is provided having an enlarged base 128 which fits in the recessed portion 123 of the piston with the stem extending through the passage 105 in the body member 103. A stem nut 129 and seal 131 are provided for this rod to prevent fluid leakage. A compression spring 133 engages the base 128 of the indicator rod to urge it into contact with the piston 113. A second concentric compression spring 135 contacts the shoulder portion 125 of the piston to urge it into contact with the sleeve-type seal 109. The remaining portions of the modified indicator assembly 101 are similar to those shown in the main form of the indicator and are designated by similar numbers.

The use, operation and function of this invention are as follows:

The fluid pressure differential indicator of this invention may be utilized to determine the pressure drop across such devices as filters to indicate clogging of the filter. The fluid entering the filter is directed to the cavity 29 through opening 31 to act against the base portion of the cup-shaped free floating piston 47. The fluid leaving the filter will be directed through the passage 39 into the cavity 29 and against the opposite side of the piston to act in conjunction with the springs 55 and 57 to resist movement of the piston away from the lower or open end 31 of the cavity. When the filter is clean, the pressure drop across the filter will be at a minimum and the combined forces exerted by the springs 55 and 57 and the fluid pressure in passage 39 will be equal to or greater than the pressure exerted by the fluid entering the filter.

As the fluid pressure in the passage 39 drops due to the increased pressure drop across the filter, the unbalanced force caused by the greater pressure of the hydraulic fluid in opening 31 acting against the piston will cause the piston 47 to move in the passage towards the closed end of the cavity and will thereby compress the springs 55 and 57. Movement of the piston away from its first position adjacent the opening 31 in the cavity towards the closed end of the cavity may be easily detected since the piston is made either of a material which visually contrasts with the transparent material of the body 23 or which contains markings which are distinguishable from the transparent material of the body. The movement of the piston 47 may be detected by comparing its alignment with the markings or indicia formed on the sleeves 79 located in the openings in the transparent bosses 23. As the pressure differential across the filter increases, the piston 47 will be moved a greater distance away from the open end of the cavity and this amount of movement can be visually detected by comparing the position of the piston relative to the indicator sleeves 79.

In the modified form of indicator assembly shown in FIGURE 4, a differential snap action of the indicating piston 113 is obtained. In this construction, the piston 113 will move away from the open end of the cavity as the pressure differential increases and this rate of movement will continue at a uniform rate until the base of the piston is clear of the sleeve-type seal 109. When the base of the piston clears the sleeve-type seal, the surface area of the piston exposed to hydraulic fluid is increased and consequently, the piston will move a greater distance for the same amount of pressure differential thus clearly indicating when the pressure differential reaches a predetermined amount such as that which may occur when the pressure drop across the filter becomes greater than that which is desired.

In the embodiment of FIGURE 4, movement of the piston is also indicated by the indicator rod 127 which moves out of the body 103 as the piston moves towards the closed end of the cavity. In addition to functioning as a visual indicator of the amount of movement of the piston, such rod may also be used to operate a switch to provide an electrical or mechanical, audio or visual signal to indicate that a certain pressure differential condition had been reached. If it is desired that the indicator rod remain at the highest differential pressure reached, the spring 133 may be eliminated and manual reset of the indicator rod would be required.

Elongated slot 43 in the body 23 may be utilized to hold a name plate or other indicator which may be conveniently formed of paper or cardboard. When the name plate is positioned in this slot, it will be held there by the base plate member 25 and thereby completely protected against mechanical damage or unauthorized removal. In a like manner, the indicating tubes or sleeves 79 may be made of an inexpensive material such as paper or plastic and this material will be completely isolated and protected from contact with the fluid contained in the body 23. If desired, the pressure differential indicia may be applied to the exterior of the connecting bolt 73 or to the interior of the bosses 23.

While the pressure differential indicator of this invention has been described as connected to a filter, it should be understood its use is not limited to measuring pressure drop across the filters only, but may also be utilized to measure pressure drops across a variety of devices. Also, it is not necessary that this indicating element be connected directly to the filter or device to be measured but as shown in the drawings through the use of a suitable adapter, it may be remotely connected to any device.

Whereas, several preferred forms of the invention have been shown and described, it should be realized that there are many modifications, substitutions and alterations thereto that may be made within the scope of this invention. Therefore, the invention should be limited only by a liberal interpretation of the appended claims.

I claim:

1. A visual pressure differential indicator including:
    a dome-shaped body of transparent material having a laterally enlarged base portion,
    a longitudinally extending cavity formed in said body,
    a piston slidably mounted in said cavity for movement between a first position and a second position with at least a portion of said piston being distinguishable from the material of said body when viewed from the exterior of said body,
    yieldable means positioned in said cavity and contacting said piston and said body to urge said piston towards said first position,
    a first opening in said body leading to a portion of said cavity on said first position side of said piston,
    a second opening in said body leading to a portion of said cavity on the second position side of said piston,
    means connecting said first opening to a first source of fluid under pressure,
    means connecting said second opening to a second source of fluid under pressure,
    means connecting said second opening to a second source of fluid normally under a lower pressure than said first source of fluid,
    at least one boss formed on said base portion and extending therefrom alongside of and spaced from said dome-shaped body, and
    indicia associated with said boss and generally aligned with the longitudinal axis of said cavity for visual alignment with said piston to indicate the position of said piston relative to said first and said second positions.

2. The structure of claim 1 further characterized in that said body has a generally flat base surface, said first opening is formed in said base surface and has a diameter at least equal to the diameter of said piston, said second opening is formed in said surface and connected with a passage which leads to said cavity and a generally flat plate is provided which connects to said base portion and has openings formed therein which are alignable with said first and second openings.

3. The structure of claim 2 further characterized in that an elongated narrow slot is formed in said body extending from said base portion and is covered by said generally flat plate.

4. The structure of claim 1 further characterized in that said cavity has a closed end, a passage extends through said closed end from said cavity to the exterior of said body, an indicator rod is mounted in said passage with a portion thereof in operating connection with said piston for movement thereof upon movement of said piston from said first to said second positions.

5. The structure of claim 1 further characterized in that a sleeve-type seal is positioned in said cavity adjoining said first position of said piston and a portion of said piston is reduced in outside diameter at the first position end thereof with said reduced portion engaging said seal when said piston is in its first position.

6. The structure of claim 1 further characterized in that:
said boss is formed of transparent material,
a longitudinally extending cavity is formed in said boss, and
the indicia associated with said boss is located inside said cavity.

7. The structure of claim 1 further characterized in that:
a pair of bosses are formed on said base portion and are located 180° apart from each other,
each boss is formed of transparent material and is integral with said base portion,
a longitudinally extending cavity is formed in each boss, and
the indicia associated with each boss is located inside said longitudinally extending cavity.

8. The structure of claim 7 further characterized in that:
said longitudinally extending cavities in the bosses extend completely through the body,
threaded bolts are positioned in said cavities and extend outwardly thereof, and
said indicia is in the form of tubes fitting around said threaded bolts.

References Cited

UNITED STATES PATENTS

| | | | |
|---|---|---|---|
| 462,837 | 11/1891 | Davis | 73—299 |
| 1,770,094 | 7/1930 | Wickersham. | |
| 2,579,120 | 12/1951 | Mercer | 116—34 |
| 2,597,724 | 5/1952 | Gratzmuller | 73—419 |
| 2,948,151 | 8/1960 | Astl | 73—406 |
| 2,948,256 | 8/1960 | Tapp | 116—34 |
| 3,066,527 | 12/1962 | Stein | 73—118 |
| 3,208,425 | 9/1965 | Jousma et al. | 116—34 |
| 3,300,769 | 1/1967 | Batur | 116—70 XR |
| 3,325,010 | 6/1967 | Sackett | 116—70 XR |
| 3,358,836 | 12/1967 | Schmitt | 116—70 XR |

FOREIGN PATENTS

| | | |
|---|---|---|
| 1,341,608 | 9/1963 | France. |

LOUIS J. CAPOZI, *Primary Examiner.*